United States Patent Office 2,876,134
Patented Mar. 3, 1959

2,876,134

STARCH-COATED PAPER-BASE MASTERS FOR PLANOGRAPHIC PRINTING

Raymond L. Oransky, Portland, and Towers Doggett, Windham, Maine

No Drawing. Application June 29, 1955
Serial No. 519,005

5 Claims. (Cl. 117—65)

This invention relates to the production of coated paper-base planographic printing masters or plates, the coating of which contains a reaction product of an hydroxyalkyl ether of starch and an amino-aldehyde resin. This application is a continuation-in-part of our pending application Serial No. 349,556, filed April 17, 1953, now Patent No. 2,724,665.

It is found that excellent masters or plates for use on rotary offset duplicators or lithographic printing presses are provided by a suitable paper base having thereon a supercalendered layer of coating which is the dry residue of an aqueous coating composition containing mineral-filler, such as clay, a partially etherified starch, i. e. a hydroxyalkyl ether of starch, and an amino-aldehyde resin.

Partially hydroxyalkylated starch adhesives suitable for use may be produced by treatment of starch according to the disclosure of U. S. Patents 2,516,632 or 2,516,633 of Kesler et al. Examples of suitable partial starch ethers produced by ethylene oxide treatment of starch are the "Penford gums," so-called, sold by Penick & Ford, Ltd. Inc., and considered to be hydroxyethyl ethers of starch. Very satisfactory hydroxyalkyl ethers of starch may be prepared by first treating raw starch to reduce its viscosity, as by conventional acid hydrolysis at a temperature below the gelation temperature of the starch, and then reacting the lowered-viscosity starch with ethylene oxide in amount between 1% and 5% based on the dry weight of the starch.

Among the water-soluble amino-aldehyde resins effective for use are dimethyol-urea other water-soluble urea-formaldehyde condensates, and water-soluble melamine-formaldehyde condensates. In general the melamine-formaldehyde resins are preferred.

The parent application referred to above claims broadly planographic printing masters having surface-coatings of the type described and the process of manufacturing the same in which the amino-aldehyde resin and the hydroxyalkyl ether of starch are reacted in situ upon the coated paper web.

The present application is directed to a modification of the basic process and to the resulting products.

For some uses it is desirable to have the surface of the plate unusually resistant to penetration by aqueous or other solution applied thereto. It is found that resistance to penetration of the coating by such solutions is enhanced if the amino-aldehyde resin and hydroxyalkyl ether of starch are partially reacted before the coating composition is applied to the sheet which forms the base for the plate. Such reaction can be brought about by heating the two reactants in aqueous medium, and the reaction can be substantially checked, or at least greatly slowed up, by lowering the temperature of the aqueous mix when the desired degree of reaction has been attained.

If desired the reaction between the amino-aldehyde resin and the hydroxyalkyl ether of starch may be brought about by heating the complete aqueous coating composition and then cooling it when the reaction has progressed sufficiently. It is usually more convenient, however, to react the amino-aldehyde resin and starch hydroxyalkyl ether in water and thereafter to mix the resulting liquid with the other ingredients of the coating composition, which mixing serves to check the reaction by dilution and cooling of the reacting components. Generally in such case it is not necessary or even desirable to include any agent to reduce to below 7.0 the pH of the aqueous medium in which the reaction takes place.

When the starch ether and the amino-aldehyde condensate are heated together in aqueous medium the mixture at first gradually becomes less viscous than would be the case if the starch ether and water were heated in the absence of the amino-aldehyde condensate. Continued heating of the mixture causes it again to increase in viscosity. Care should be taken to check the reaction before the viscosity increases to a marked degree; otherwise the composition will form an unusable rubbery gel. In other words, the reaction is only partially completed prior to application of the coating composition to the paper base; thereafter the reaction is continued during drying of the coated web at a temperature somewhat higher than room temperature. The coating does not require the high temperature and/or the prolonged period of heating which is required in cases where the starch ether and amino-aldehyde resin are merely mixed in the coating composition. If it is desired to complete the curing at a still lower temperature or in a still shorter time, an acid catalyst, e. g. monochloracetic acid, may be added to the coating composition which contains the partially reacted starch ether and amino-aldehyde resin.

One embodiment of the invention is shown in following Example 1.

EXAMPLE 1

A paper web having a basis weight of about 55 pounds per ream of 500 sheets 25 x 38 inches in size was surface-filled on both sides with about 2 pounds dry weight per ream per side of an aqueous composition containing equal weights of clay and ammonium caseinate and sufficient commercial formaldehyde solution to make the pH value of composition slightly below 7.0. This surface-treated paper was dried and then was coated on one side by means of a conventional air-knife coating machine with 16 pounds per ream, dry weight, of an aqueous coating composition made by following Formula No. 1 in which all units of quantity are units of weight.

*Formula 1*

Disperse in 292 units of water 40 units of partially hydroxyethylated starch (Penford gum 280) and 12 units of a partially condensed melamine-formaldehyde resin (Parez 605 made by American Cyanamid Company, and heat the mixture to 99° C. and maintain it at 99° C. for about 15 minutes until a sample withdrawn and cooled to 25.5° C. has a viscosity of 800 centipoises as measured on a Brookfield viscometer. Cool the mixture and mix therewith the following:

| | Units |
|---|---|
| Fine particle clay | 100 |
| Water | 100 |
| Sodium sulfate derivative of 7-ethyl-2-methyl undecanol-4 (a wetting agent) | 0.4 |
| Tributyl phosphate (an anti-foam agent) | 0.2 |

The so-coated web was dried by forced air circulation with air at 150° C. The dried web was then calendered by passage through a conventional supercalender.

The product of Example 1 was excellent for use as a direct-image, short-run planographic printing master. The surface was so impermeable to liquid that after a greasy image was affixed to the surface the master could be put on a rotary duplicator and run without any preliminary wetting out or starting treatment other than that given by the molleton rolls in normal operation of a planographic press.

Though the invention makes possible production of a very desirable direct-image planographic master at a very moderate cost, it also is unusually effective in providing a satisfactory base for subsequent photosensitizing by means of the diazo or azido photosensitizing compounds. Such a suitable base for photosensitization is shown in following Example 2.

EXAMPLE 2

A wet-strength paper web of approximately 70 pounds weight, based on a ream of 500 sheets cut to a size of 25 x 38 inches, was prepared from a paper-making furnish containing beaten soda pulp and bleached kraft, rosin-size, melamine-formaldehyde resin, and alum. The formed web was dried and then surface-sized with a water solution of ammoniacal casein made slightly acidic by addition of a commercial water solution of formaldehyde. The sheet was again dried and then coated on each side with a layer equivalent to a dry weight of about 12 pounds per ream of the composition shown in following Formula 2.

*Formula 2*

| | Parts by weight |
|---|---|
| Pigment (finely divided clay) | 100.00 |
| Casein (in a water solution of ammonia) | 25.00 |
| Dimethyol urea (to insolubilize the casein) | 2.5 |
| Tributyl phosphate (anti-foam agent) | 0.8 |
| Water | 200.0 |

The so-coated web was dried at a temperature of about 50° C. for 15 minutes.

The dried web described was then coated on one side, to the amount of 13 pounds per ream dry weight, with the composition made according to following Formula 3.

*Formula 3*

Heat 2340 units by weight of water with 320 units of a hydroxyethyl ether of starch and 96 units of a partially condensed melamine-aldehyde resin (American Cyamid's Aerotex U. M. Special) at 99° C. for 30 to 45 minutes until a sample withdrawn and cooled to 25.5° C. has a viscosity of 800 centipoises as measured on a Brookfield viscometer. Cool the mixture and mix it with the following ingredients:

| | |
|---|---|
| Clay, fine particle | 800 |
| Water | 850 |
| Sodium sulfate derivative of 7-ethyl-2 methyl undecanol-4 (wetting agent) | 3 |
| Tributyl phosphate (anti-foam agent) | 1.5 |

The paper web coated with the composition made according to Formula 3 was then dried at about 50° C. for about 15 minutes and then was calendered on a conventional supercalender.

The supercalendered coated web of the foregoing Example 2 is exceptionally suitable for sensitization by dilute solutions, e. g. 1% to 2% solutions, of diazo or azido sensitizers. Such dilute solutions are of low viscosity and tend to penetrate into the pores of any surface to which they may be applied. After such a sensitized surface has been exposed to actinic radiation it is usually desired to remove in toto from certain areas of the surface either the unreacted sensitizer or the decomposition products of said sensitizer. If such resulting solution has penetrated into the coating layer on the web such total subsequent removal of sensitizer or its decomposition products becomes difficult. The coated product of Example 2, because of its resistance to penetration, makes possible the desired subsequent removal in the desired areas. At the same time the unremoved material in the imaged areas adheres strongly to the surface so that a very satisfactory photolithographic master results.

Photo-sensitive diazo or azido compounds for photosensitizing planographic or lithographic printing plates are well known and are disclosed in, for example, U. S. Patents Nos. 2,626,866 and 2,649,373.

The quantity of hydroxyethyl or other hydroxalkyl ether of starch used in the coating composition per pound of mineral pigment will vary depending in part upon the particular pigment being used, the particular paper stock to which it is being applied, and the number of copies that are required to be printed from the finished plates. Obviously sufficient adhesive must be used to bind the coating to the base with sufficient force so that it will not be pulled away from the base by the tack of the printing-ink on the printing press. About 25 parts of the hydroxyalkyl ether of starch per 100 parts of clay is usually considered about the minimum that can safely be used. As the quantity of the hydroxyalkyl ether of starch is increased the strength of the coating obviously likewise increases, but tendency to trouble from curling likewise increases at the same time. Consequently about 75 parts of the starch ether per 100 parts of pigment is about the maximum feasible for use. The preferred range is from about 35 to about 50 parts of hydroxyalkyl ether of starch to 100 parts of clay.

The ratio of amino-aldehyde resin to starch ether may be varied considerably. Normally, 25% of amino-aldehyde resin based on the weight of the starch hydroxyalkyl ether may be expected adequately to insolubilize the starch ether. Sometimes even smaller quantities of the resin may give a substantial degree of insolubility. One the other hand, considerably larger quantities of the resin may be used if desired. In fact, a quantity of amino-aldehyde resin up to 100% of the weight of the starch ether may be included in the composition without making the resulting coated surface unduly "sensitive" or susceptible to toning or soiling by ink during the printing operation. In every day operation it is convenient to use a weight of amino-aldehyde resin equal to about 35% of the weight of the hydroxyalkylated starch ether present.

The length of time that it is advisable or safe to react the hydroxyalkyl ether of starch with the amino-aldehyde resin will depend, as is well understood, in part upon the concentration of the reactants, upon the ratio of the reactants, upon the pH value of the aqueous mixture, and upon the temperature to which the mixture is heated, as well as upon the constitution of the amino aldehyde resin itself. Variables in the resin constitution will include the specific amino- and aldehyde-compounds reacted, the ratio of such compounds, and the degree to which the reacting compounds have been condensed during manufacture of the resin.

Clay is the preferred pigmentary material for use in the coating composition. If desired it may be replaced in part by other inert pigment, such as talc, blanc fixe, titanium oxide, and the like.

What is claimed is:

1. Process of making a coated paper product adapted for use as a planographic printing master which includes only partially reacting in aqueous medium at elevated temperature 100 parts by weight of a hydroxyalkyl ether of starch and from about 25 to about 100 parts by weight of an amino-aldehyde resin, checking the reaction, applying the reacted mixture together with an aqueous suspension of from about 133 to about 400 parts by weight of finely divided mineral pigment to the surface of a paper base to coact the same, drying the coated paper and calendering the dried coated paper.

2. Process of claim 1 in which the hydroxyalkyl ether of starch is a hydroxyethyl ether.

3. Process of claim 2 in which the amino-aldehyde resin is a melamine-formaldehyde resin.

4. Process of making a coated paper product adapted for use as a planographic printing master which includes only partially reacting in aqueous medium at elevated temperature and at a pH of at least 7 a hydroxyethyl ether of starch and sufficient melamineformaldehyde condensate to impart a substantial degree of water insolubility to the resulting reaction product after it has been dried, the reaction being continued only until the viscosity of the mixture first decreases and then begins to increase, checking the reaction before the viscosity increases materially, forming a coating composition of the resulting reaction product and an aqueous suspension of finely divided mineral pigment, the weight ratio of dry hydroxyethyl ether of starch to dry mineral pigment in said coating composition being between about 25 and about 75 parts by weight of the hydroxyethyl ether of starch to each 100 parts by weight of mineral pigment, applying said coating composition to the surface of a paper base to coat the same, heating the resulting coated paper base to about 150° C. to dry the coating and calendering the resulting dried coated paper.

5. A coated paper product adapted for use as a planographic printing master made by the process defined in claim 1.

References Cited in the file of this patent

UNITED STATES PATENTS

| | | |
|---|---|---|
| 2,297,698 | Freeman | Oct. 6, 1942 |
| 2,453,608 | West | Nov. 9, 1948 |
| 2,603,576 | Cook | July 15, 1952 |
| 2,622,997 | Lolkema | Dec. 23, 1952 |
| 2,724,665 | Oransky | Nov. 22, 1955 |

FOREIGN PATENTS

| | | |
|---|---|---|
| 479,890 | Canada | Jan. 1, 1952 |